United States Patent [19]

Shishido

[11] Patent Number: 5,434,730
[45] Date of Patent: Jul. 18, 1995

[54] SPINDLE MOTOR AND RECORDING MEDIUM ASSEMBLY

[75] Inventor: Yuji Shishido, Kanagawa, Japan

[73] Assignee: Sony Corporation, Tokyo, Japan

[21] Appl. No.: 178,937

[22] Filed: Jan. 7, 1994

Related U.S. Application Data

[63] Continuation-in-part of Ser. No. 9,336, Jan. 26, 1993, abandoned, which is a continuation of Ser. No. 730,121, Jul. 15, 1991, abandoned.

[30] Foreign Application Priority Data

Jul. 28, 1990 [JP] Japan .................. 2-199836

[51] Int. Cl.⁶ .................................................. G11B 17/02
[52] U.S. Cl. ................................................ 360/99.08
[58] Field of Search ............... 360/99.04, 99.05, 99.08, 360/99.12; 369/270, 271; 310/67 R

[56] References Cited

U.S. PATENT DOCUMENTS 5,038,240  8/1991  Isomura ..................... 360/99.08

Primary Examiner—Robert S. Tupper
Attorney, Agent, or Firm—Limbach & Limbach

[57] ABSTRACT

A spindle motor and recording medium assembly having a rotary shaft, and a rotary portion. The rotary portion includes a recording medium, a fixing member, a boss, and rotating motor elements including an annular magnet and a rotary yoke, wherein the boss secures the recording medium, wherein the rotary shaft and the boss are integrally joined together and the center of gravity of the rotary portion in a direction along the rotary shaft is positioned in a portion where the rotary shaft and the boss are connected to each other. In a preferred embodiment in which the recording medium is a hard disk, the hard disk is attached to the boss in such a position that a line running through the center of the thickness of the hard disk extends so as not to deviate from a portion where the rotary shaft and the boss are connected to each other.

3 Claims, 4 Drawing Sheets

SPINDLE MOTOR AND RECORDING MEDIUM ASSEMBLY

CROSS-REFERENCE TO RELATED APPLICATION

This is a continuation-in-part of U.S. patent application Ser. No. 08/009,336, filed Jan. 26, 1993, now abandoned, which is a continuation of U.S. Ser No. 07/730,121, filed Jul. 15, 1991, now abandoned.

BACKGROUND OF THE INVENTION

1. FIELD OF THE INVENTION

The present invention relates to a spindle motor suitably used for rotatively driving a hard disk as in a magnetic disk unit.

2. DESCRIPTION OF THE RELATED ART

There has been hitherto a spindle motor to rotatively drive a hard disk serving as a magnetic recording medium as in a magnetic disk unit. In such a spindle motor, a rotary shaft is fitted into a boss fixing the hard disk. The boss and the rotary shaft are rotated together. (Refer to Japanese Utility Model Laid-Open No. 1-61858.)

As shown in FIG. 1, in a spindle motor 1, a cylinder-shaped bearing-retaining portion 2A is formed at the center of a flange-shaped bracket 2. A rotary shaft 6 is rotatably supported through bearings 3 and 4 by the internal peripheral surface of the bearing-retaining portion 2A.

One end of the rotary shaft 6 is fitted into a fixing hole 8A of a boss 8. The rotary shaft 6 and the boss 8 are constructed so as to rotate together.

A hard disk 11 is secured by a fixing member 12 to an external peripheral surface 8B of the boss 8.

A coil portion 16 composed of a winding wound around an iron core 15 is secured to an external periphery of the bearing-retaining portion 2A. A rotary yoke 17 and an annular magnet 18 are also secured to an internal peripheral surface 8C of the boss 8 so as to face the coil portion 16.

Thus the introduction of an operating electric current to the winding 14 causes the rotary shaft 6 and the boss 8 to rotate together, thereby rotatively driving the hard disk 11.

By making a magnetic disk unit smaller and thinner, it is possible for users to use the magnetic disk unit more freely when it is mounted in, for example, a small portable computer.

There is thus a demand that the spindle motor for rotating such a magnetic disk be made even thinner. For example, the entire spindle motor 1 shown in FIG. 1 can be made thinner if the fixing hole 8A of the boss 8 (that is, the thickness of a portion 19 where the boss 8 is joined to the rotary shaft 6) can be made shallower. (The portion 19 is hereinafter referred to as a joining portion 19.)

In the spindle motor 1 as constructed above, a position where the hard disk 11, secured to the external peripheral surface 8B of the boss 8, is attached is offset with respect to the joining portion 19 of the rotary shaft 6 and the boss 8 in a direction in which the rotary shaft 6 rotates (hereinafter called simply a rotary shaft direction) For this reason, as shown in FIG. 2, when the hard disk 11 is secured to the boss 8, and impact force $F_0$ is applied to the hard disk 11 from, for instance, a direction indicated by an arrow "a" (or radial direction) moment force is applied to the joining portion 19 in a direction indicated by an arrow "b". Because of the application of the moment force, when the rotary shaft 6 is made of, for example, hard stainless steel, and the boss 8 of a soft aluminum material, the fixing hole 8A in the boss 8 is deformed in the joining portion 19.

In other words, when the impact force $F_0$ is applied to the hard disk 11 from, for example, the radial direction, force $F_1$ acts on the center of gravity $G_1$ of the joining portion 19 (of a rotary portion 1A) in the rotary shaft direction. The rotary portion 1A is composed of the boss 8, the hard disk 11, the fixing member 12, the rotary yoke 17, and the annular magnet 18. The force $F_1$ is expressed by the following equation:

$$F_1 = M \times F_0 \qquad (1)$$

where M is the mass of the rotary portion 1A.

When the force $F_1$ acts, an offset yield stress acting on a unit area of a surface where the boss 8 is in contact with the rotary shaft 6 (hereinafter simply called a contact surface) is expressed as $F_2$ in the following equation. The fulcrum of the boss 8 with respect to a direction b in which moment force is applied is given as O. When the following conditional equation (2) is satisfied, the fixing hole 8A or the contact surface of the boss 8 is diagonally and plastically deformed:

$$\int_O^P F_2 z\, dz < L_1 F_1 \qquad (2)$$

where z is a unit area of the contact surface, points O and P being the upper and lower ends of the joining portion 19.

Thus, the hard disk 11 secured to the boss 8 will not be positioned precisely at right angles with the rotary shaft 6, as indicated by dash-and-dot lines 1B in FIG. 2. When the spindle motor 1 is rotated to rotatively drive the hard disk 11, a surface 11A of the hard disk 11 onto which information is recorded (hereinafter referred to as an information recording surface 11A) is appreciably vibrated up and down, and what is called mechanical vibration characteristics are deteriorated. As a result, the information recording surface 11A comes into contact with an information reading head (not shown), thereby damaging the information reading head, or making it difficult to accurately read information. The information reading head is disposed about 0.2 $\mu$m above the information recording surface 11A.

SUMMARY OF THE INVENTION

The present invention has been made in view of the above. The object of the invention is therefore to provide a spindle motor whose mechanical characteristics do not deteriorate when impact force is applied.

According to the invention, in a spindle motor in which a boss and a rotary shaft are integrally joined together, the center of gravity of a rotary portion in a rotary shaft direction is positioned within a portion where the boss and the rotary shaft are joined together, or a position where a hard disk is attached to the boss is set so that a line running through the center of the thickness of the hard disk extends so as not to deviate from the portion where the boss and the rotary shaft are joined together. Because of this construction, when impact force is applied to the boss or to a hard disk secured to the boss, deterioration of the mechanical vibration characteristics of the boss is reduced.

To solve the problems mentioned above, the present invention provides a spindle motor assembly 20 comprising rotary portion 20A (including fixing member 25, boss 23, recording medium 11, rotary yoke 17, and annular magnet 18) and rotary shaft 22. Recording medium 11 is fixedly attached to boss 23, and the rotary shaft and the boss are integrally joined together, wherein the center of gravity $G_2$, along the axis of rotation of the rotary shaft, of the rotary portion 20A is positioned along the joining portion 30 where the rotary shaft 22 and the boss 23 are connected to each other.

The center of gravity $G_2$ of the rotary portion 20A in the rotary shaft direction is formed at the center of the joining portion 30 where the boss 23 and the rotary shaft 22 are joined together with respect to the rotary shaft direction.

This invention also provides a spindle motor assembly 20 comprising the rotary portion 20A where the rotary shaft 22 and the boss 23 to which a hard disk 11 is secured are integrally joined together, wherein a position where the hard disk 11 is attached to the boss 23 is set so that a line A running through the center of the thickness of the hard disk 11 extends so as not to deviate from the joining portion 30 where the rotary shaft and the boss are connected to each other.

Because the center of gravity $G_2$ of the rotary portion 20A in the rotary shaft direction (direction D shown in FIG. 3, parallel to the longitudinal axis of shaft 22) lies in the joining portion 30 (where the rotary shaft 22 and the boss 23 are connected to each other), moment force will not be generated in the joining portion 30 when impact force $F_0$ is applied. This permits the boss 23 to be disposed precisely at right angles with the rotary shaft 22.

A position where the hard disk 11 is attached to the boss 23 is set so that the line A running through the center of the thickness of the hard disk 11 extends so as not to deviate from the contact surface $L_2$ of the joining portion 30 (where the rotary shaft 22 and the boss 23 are connected to each other) Therefore, when the impact force $F_0$ is applied to the hard disk 11 from the radial direction, the moment force will not be generated in the joining portion 30 (where the rotary shaft 22 and the boss 23 are connected to each other). This also permits the boss 23 to be disposed precisely at right angles with the rotary shaft 22.

DESCRIPTION OF THE PREFERRED EMBODIMENTS

An embodiment of the present invention will be described below in detail with reference to the drawings.

Figure 1:
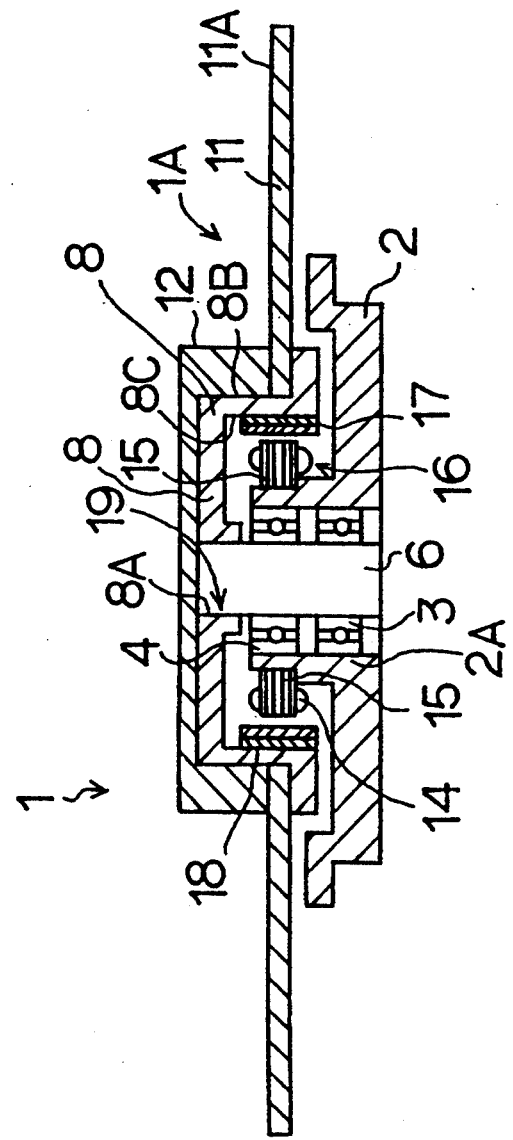
FIG. 1 is a cross-sectional view showing the conventional spindle motor.
Figure 2:
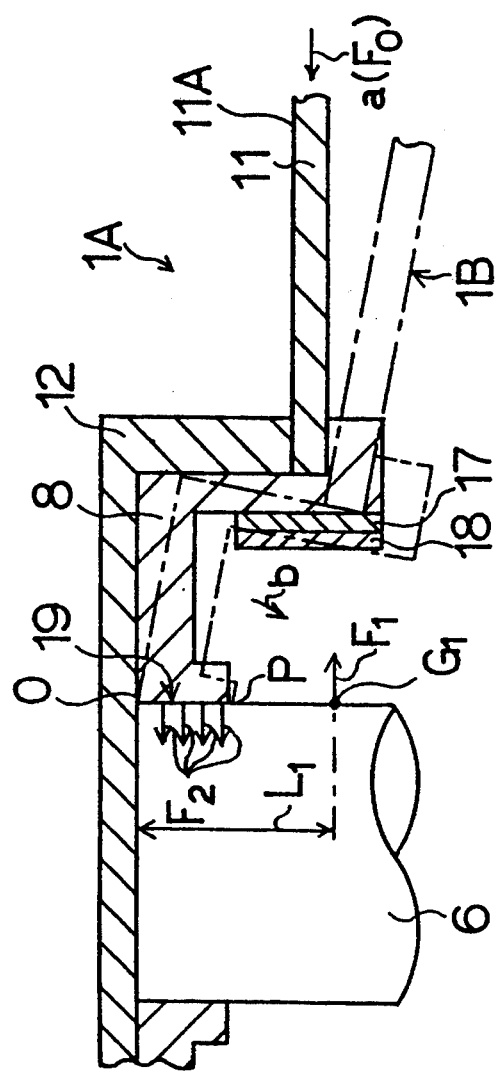
FIG. 2 is an enlarged partial cross-sectional view showing where the boss and the rotary shaft of the conventional spindle motor are joined together.
Figure 3:
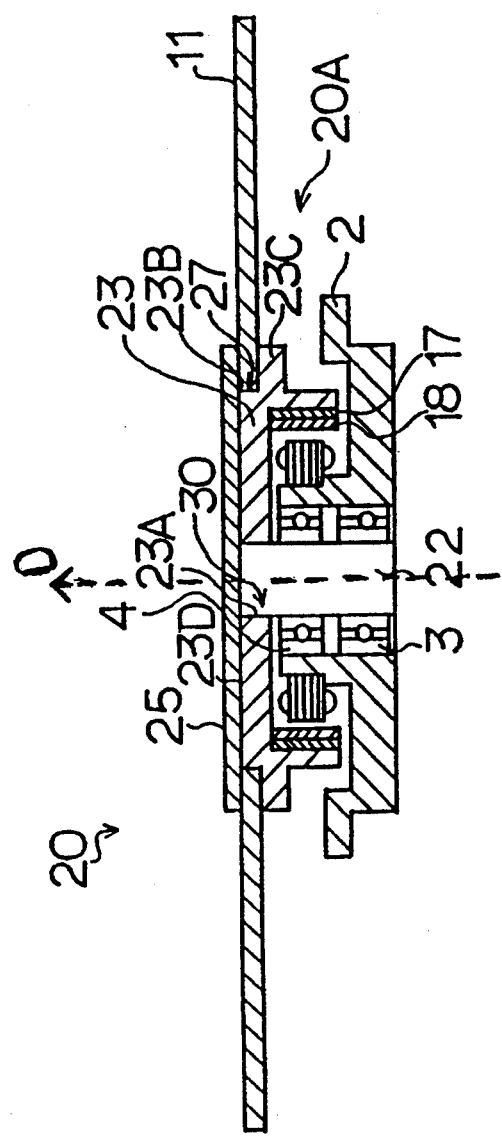
FIG. 3 is a cross-sectional view showing an embodiment of a spindle motor according to the present invention.

In FIG. 3, components corresponding to those in FIG. 1 are denoted by the same reference numbers. In FIG. 3 one end of a rotary shaft 22 made of stainless steel is fitted into a fixing hole 23A bored at the center of a boss 23 made of an aluminum material. A method such as one by pressure or by bonding is used for this fitting. The rotary shaft 22 and the boss 23 are integrally and rotatably supported by a bracket 2 through bearings 3 and 4.

The boss 23 has a base 23C projected from an external peripheral surface 23B thereof. A hard disk 11 is placed on the base 23C from above while it is brought to mate with the external peripheral surface 23B. After the hard disk 11 has been placed, a disk-shaped fixing member 25 is screwed to an upper side face 23D of the boss 23, which screwing allows the hard disk 11 to be integrally secured to the boss 23.

Figure 4:
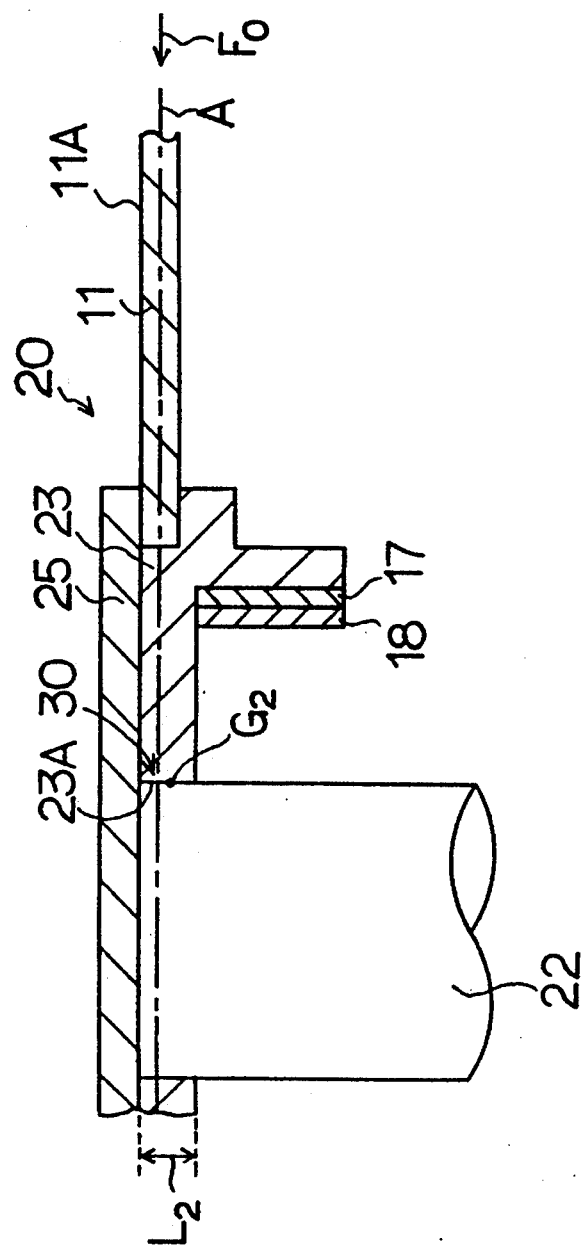
FIG. 4 is an enlarged partial cross-sectional view showing where the boss and the rotary shaft of the spindle motor are joined together.

A portion of the rotary portion 20A is magnified and shown in FIG. 4, which rotary portion 20A is composed of the boss 23, the hard disk 11, the fixing member 25, a rotary yoke 17, and an annular magnet 18. In FIG. 4, a line A running through the center of the thickness of the hard disk 11 extends so as not to deviate from a surface $L_2$ on which the rotary shaft 22 and the boss 23 come into contact with each other (hereinafter called a contact surface $L_2$). The contact surface $L_2$ is disposed within a portion 30 where the rotary shaft 22 and the boss 23 are joined together (hereinafter referred to as a joining portion 30). The center of gravity $G_2$ of the rotary portion 20A in a direction in which the rotary shaft 22 rotates (hereinafter referred to as a rotary shaft direction) is preferably positioned (as shown in FIG. 4) so as to be at the center of the joining portion 30 in the rotary shaft direction.

Assuming that the distances between any position P which can be considered to be an imaginary origin in the axial direction of the rotary shaft 22, and the center of gravity of the fixing member 25, the disk 11, the boss 23, the annular magnet 18 and the rotary yoke 17 are X1, X2, X3, X4 and X5, respectively, and assuming that their respective weights are m1, m2, m3, m4 and m5, the synthesized center of gravity $G_2$ of rotary portion 20A comprising the fixing member 25, the disk 11, the boss 23, the annual magnet 18 and rotary yoke 17 is as shown in the following equation positioned Xg2 away from the position P:

$$Xg2 = \frac{\sum_{i=1}^{5} Xi \cdot mi}{\sum_{i=1}^{5} mi}$$

Namely, it is important in the invention that the center of gravity $G_2$ should be located within the range of $L_2$ in FIG. 4.

Therefore, when impact force $F_0$ is applied to the hard disk 11 from a radial direction (or direction at right angles with the rotary shaft 22), only a compressive stress is applied through the hard disk 11 and the boss 23 to the joining portion 30 (where the rotary shaft 22 and the boss 23 are united together). Moment force will not be generated as in the conventional art.

Because it is possible to prevent the fixing hole 23A in the boss 23 from being diagonally deformed, the hard disk 11 can remain at right angles with the rotary shaft 22.

As described above, the line A running through the center of the thickness of the hard disk 11 extends so as not to deviate from the contact surface $L_2$ of the joining portion 30. The center of gravity $G_2$ of the rotary portion 20A in the rotary shaft direction lies so as to be at the center of the contact surface $L_2$ of the joining portion 30 in the rotary shaft direction. Such a construction can therefore retain a surface 11A of the hard disk 11, onto which information is recorded, at right angles with the rotary shaft 22 when the impact force $F_0$ is applied to the hard disk 11 from the radial direction.

Even if the hard disk 11 is being rotated when the impact force $F_0$ is applied, the information recording surface 11A can be prevented from being mechanically vibrated up and down. This makes it possible to record or reproduce information with certainty, while preventing a recording/reproducing head from being damaged.

Because moment force will not be applied to the joining portion 30, the generation of force, such as force which may deform a surface of the boss 23 with which the rotary shaft 22 is in contact, can be further reduced even when the impact force is applied from the radial direction. This makes it possible to further reduce the size of the fixing hole 23A in the boss 23.

The spindle motor 20 can thus be made even thinner than the conventional art.

The above embodiment has been described in which the center of gravity $G_2$ of the rotary portion 20A is positioned so as to be at the center of the joining portion 30 in the rotary shaft direction. However, the present invention is not limited to this embodiment. The same effects as above can also be obtained when the center of gravity $G_2$ of the rotary portion 20A is positioned so as to remain within the contact surface $L_2$ of the joining portion 30.

In the embodiment mentioned above, the rotary shaft 22 and the boss 23 both of which are made of different materials are joined together. However, the invention is not limited to this structure and may also be applied to a spindle motor in which a rotary shaft and a boss made of the same material are united together to constitute a rotary portion.

In the previously mentioned embodiment, the pressure or bonding method is employed to join the rotary shaft 22 and the boss 23 together. In the present invention, however, a method of joining the two components is not limited to the above methods. The pressure and bonding methods may be employed together or another method, such as a shrink fitting method, may also be employed.

In addition, although this invention is applied to a spindle motor in a magnetic disk unit, it may also be applied to various spindle motors in electronic equipment other than that described above.

As has been described above, in accordance with the invention, when impact force is applied, moment force will not be generated in the joining portion (where the boss and the rotary shaft are joined together). It is thus possible to realize a spindle motor capable of avoiding a deterioration in mechanical vibration characteristics.

What is claimed is:

1. A spindle motor and recording medium assembly, comprising:

a rotary shaft having a longitudinal axis;

a rotary portion including a recording medium, a boss, a recording medium fixing member fixedly attached to the boss, and rotating motor elements fixedly attached to the boss, wherein the boss supports the recording medium, wherein the rotary shaft and the boss are integrally joined together at a joining portion of the rotary shaft, wherein the rotating motor elements include a rotary yoke and an annular magnet, and wherein the center of gravity, along the longitudinal axis, of said rotary portion lies along the joining portion;

a stationary motor portion; and means for rotatably mounting the rotary portion and the rotary shaft to the stationary motor portion, so that the rotary portion and the rotary shaft are free to rotate as a unit relative to the stationary motor portion.

2. The assembly of claim 1, wherein the center of gravity, along the longitudinal axis, of said rotary portion lies substantially at a center point of the joining portion.

3. A spindle motor and hard disk assembly, comprising:

a rotary shaft having a longitudinal axis;

a rotary portion including a hard disk having a flat portion, a boss, a disk fixing member fixedly attached to the boss, and rotating motor elements fixedly attached to the boss, wherein the boss supports the hard disk, wherein the rotating motor elements include a rotary yoke and an annular magnet, wherein a center plane extends through the flat portion, wherein the rotary shaft and the boss are integrally joined together at a joining portion of the rotary shaft, wherein the boss is shaped so that the center plane is oriented substantially perpendicular to the longitudinal axis and the center plane extends through the joining portion, and wherein the center of gravity, along the longitudinal axis, of said rotary portion lies along the joining portion;

a stationary motor portion; and means for rotatably mounting the rotary portion and the rotary shaft to the stationary motor portion, so that the rotary portion and the rotary shaft are free to rotate as a unit relative to the stationary motor portion.

* * * * *